US010702836B2

(12) United States Patent
Schulz et al.

(10) Patent No.: US 10,702,836 B2
(45) Date of Patent: Jul. 7, 2020

(54) MASS-TRANSFER MACHINE

(71) Applicant: JULIUS MONTZ GmbH, Hilden (DE)

(72) Inventors: Robin Schulz, Kamen (DE); Egon Zich, Leichlingen (DE); Helmut Jansen, Dormagen (DE); Thorsten Erik Alexander Hugen, Essen (DE)

(73) Assignee: JULIUS MONTZ GmbH, Hilden (DE)

( * ) Notice: Subject to any disclaimer, the term of this patent is extended or adjusted under 35 U.S.C. 154(b) by 161 days.

(21) Appl. No.: 16/110,641

(22) Filed: Aug. 23, 2018

(65) Prior Publication Data
US 2019/0076795 A1   Mar. 14, 2019

(30) Foreign Application Priority Data

Sep. 14, 2017   (DE) .................. 10 2017 008 628

(51) Int. Cl.
*B01F 3/04*   (2006.01)
*B01D 3/30*   (2006.01)
(Continued)

(52) U.S. Cl.
CPC ............ *B01F 3/04531* (2013.01); *B01D 3/08* (2013.01); *B01D 3/30* (2013.01); *B01J 19/1806* (2013.01); *B01J 19/28* (2013.01); *B01J 19/30* (2013.01); *B01J 19/32* (2013.01); *B01F 2003/04645* (2013.01); *B01F 2003/04709* (2013.01); *B01J 2219/30483* (2013.01); *B01J 2219/30491* (2013.01); *B01J 2219/32203* (2013.01); *B01J 2219/32408* (2013.01); *B01J 2219/32416* (2013.01); *B01J 2219/32441* (2013.01);
(Continued)

(58) Field of Classification Search
CPC ........ B01D 3/08; B01D 3/30; B01F 3/04531; B01F 2003/04645; B01F 2003/04709; B01J 19/1806; B01J 19/28; B01J 19/30; B01J 19/32; B01J 2219/30483; B01J 2219/30491; B01J 2219/32203; B01J 2219/32408; B01J 2219/32416; B01J 2219/32441; B01J 2219/32483; B01J 2219/32491
USPC ..................................... 261/79.2, 84, 85, 88
See application file for complete search history.

(56) References Cited

U.S. PATENT DOCUMENTS 2,941,872 A * 6/1960 Pilo et al. ................. B04B 5/06
                                                          422/259
3,701,513 A * 10/1972 Carter .................... F02M 9/125
                                                          261/18.2
(Continued)

FOREIGN PATENT DOCUMENTS

DE      102010054516 A1   6/2012
EP           0089128 A    5/1986
(Continued)

*Primary Examiner* — Charles S Bushey

(57) ABSTRACT

In an apparatus for mass transfer between a liquid and a gas inside a rotor, the liquid is supplied to a center of the rotor and is driven outward by centrifugal force generated by rotation of the rotor, the gas surrounding the rotor is forced inward through the rotor by a pressure of the gas, counter to the liquid flow in the rotor, and the rotor has a plurality of passages lying in the plane of the rotor that begin at a center of the rotor and terminate at an outer circumference of the rotor. The passages are each filled with a packing that increases the area of contact between the liquid and the gas.

20 Claims, 2 Drawing Sheets

(51) Int. Cl.
  *B01D 3/08* (2006.01)
  *B01J 19/18* (2006.01)
  *B01J 19/30* (2006.01)
  *B01J 19/32* (2006.01)
  *B01J 19/28* (2006.01)
(52) U.S. Cl.
  CPC ............... *B01J 2219/32483* (2013.01); *B01J 2219/32491* (2013.01)

(56) References Cited

U.S. PATENT DOCUMENTS

| 3,991,143 | A | * | 11/1976 | Carter ..................... F02M 17/16 |
| | | | | 261/18.2 |
| 4,283,255 | A | | 8/1981 | Ramshaw |
| 4,382,045 | A | * | 5/1983 | Wem ..................... B01J 19/0066 |
| | | | | 261/89 |
| 4,549,998 | A | * | 10/1985 | Porter ................ B01D 11/0453 |
| | | | | 261/88 |
| 4,692,283 | A | * | 9/1987 | Wem ......................... B04B 7/18 |
| | | | | 261/89 |
| 5,363,909 | A | | 11/1994 | Acharya et al. |
| 6,048,513 | A | * | 4/2000 | Quarderer ............ B01J 19/0066 |
| | | | | 423/473 |
| 8,702,071 | B2 | * | 4/2014 | Mello ................... B01D 53/185 |
| | | | | 261/118 |
| 9,987,589 | B2 | | 6/2018 | Kotagiri |
| 2013/0319235 | A1 | * | 12/2013 | Wolf ....................... B01D 3/30 |
| | | | | 95/151 |
| 2016/0317967 | A1 | * | 11/2016 | Kotagiri ................... B01D 3/30 |
| 2017/0028311 | A1 | | 2/2017 | Namdeo |
| 2018/0016159 | A1 | * | 1/2018 | Mello ....................... C02F 1/50 |
| 2018/0361312 | A1 | * | 12/2018 | Dutra e Mello ... B01D 53/1493 |

FOREIGN PATENT DOCUMENTS

| GB | 265120 | A | 7/1927 |
| GB | 757149 | A | 9/1956 |

* cited by examiner

# MASS-TRANSFER MACHINE

FIELD OF THE INVENTION

The present invention relates to an apparatus for mass-transfer. More particularly this invention concerns a mass-transfer machine.

BACKGROUND OF THE INVENTION

In an apparatus for mass transfer between a liquid and a gas inside a rotor, liquid is supplied to the center of the rotor and is driven outward by the centrifugal force generated by rotation of the rotor and gas surrounding the rotor is forced inward through the rotor by the gas pressure, counter to the liquid flow in the rotor.

WO 2015/101826 (U.S. Pat. No. 9,987,589) and WO 2016/038480 (US 2017/0028311) disclose mass-transfer machines having a rotor that has two lateral faces, a packing that drives centrally delivered liquid outward as the rotor rotates in the space between the two faces. Here the rotor is surrounded by a gas that due to the gas pressure flows through the rotor counter to the liquid, in order to produce a mass transfer between the liquid and the gas.

OBJECTS OF THE INVENTION

It is therefore an object of the present invention to provide an improved mass-transfer machine.

Another object is the provision of such an improved mass-transfer machine that overcomes the above-given disadvantages, in particular in which the mass transfer and the transport of material are substantially improved and that is easy to manufacture and assemble.

SUMMARY OF THE INVENTION

In an apparatus for mass transfer between a liquid and a gas inside a rotor, where
the liquid is supplied to a center of the rotor and is driven outward by centrifugal force generated by rotation of the rotor,
the gas surrounding the rotor is forced inward through the rotor by a pressure of the gas, counter to the liquid flow in the rotor, and
the rotor has a plurality of passages lying in the plane of the rotor that begin at a center of the rotor and terminate at an outer circumference of the rotor, the improvement wherein the passages are each filled with a packing that increases the area of contact between the liquid and the gas.

In other words, according to the invention this object is achieved in that the rotor comprises a plurality of passages lying in the plane of the rotor and that begin in the center of the rotor and terminate at the outer circumference of the rotor, the passages each being filled with a packing that increases the area of contact between the liquid and the gas.

Dividing the rotor packing into individual packing areas inside radial or angled passages inside the rotor allows an especially precise and effective mass transfer in a rotor that is easy to manufacture and assemble.

It is particularly advantageous for this purpose if the packings enclosed in the passages, particularly tubular passages, are of a woven, knitted, meshed or latticed form. Here the packings, in particular smooth or structured packings, enclosed in the passages, in particular tubular passages, are composed of metal, in particular formed from structured sheet metal, or of plastic or glass fibers.

It is proposed that preferably the inner ends of the passages or tubes form an inner coaxial space into which the liquid is delivered. It is advantageous here if the tubes or their passages are arranged in the rotor, particularly in the center of the rotor, in such a way that the liquid flowing through the rotor flows only through the passages.

It is also advantageous if the outer ends of the passages or tubes terminate in the outer cylindrical annular surface 20 of the rotor. The rotor preferably comprises two to thirty-two, preferably four to eight passages, in particular tubes.

In a simple rotor design that is easy to produce the rotor comprises two circular lateral disks or faces to which the axis of rotation of the rotor runs perpendicular and that form a space between them in which the passages, in particular tubes, are arranged. The tubes/the passages may also extend outward continuously or in steps. The tubes/passages may furthermore be assembled from individual, separate portions.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
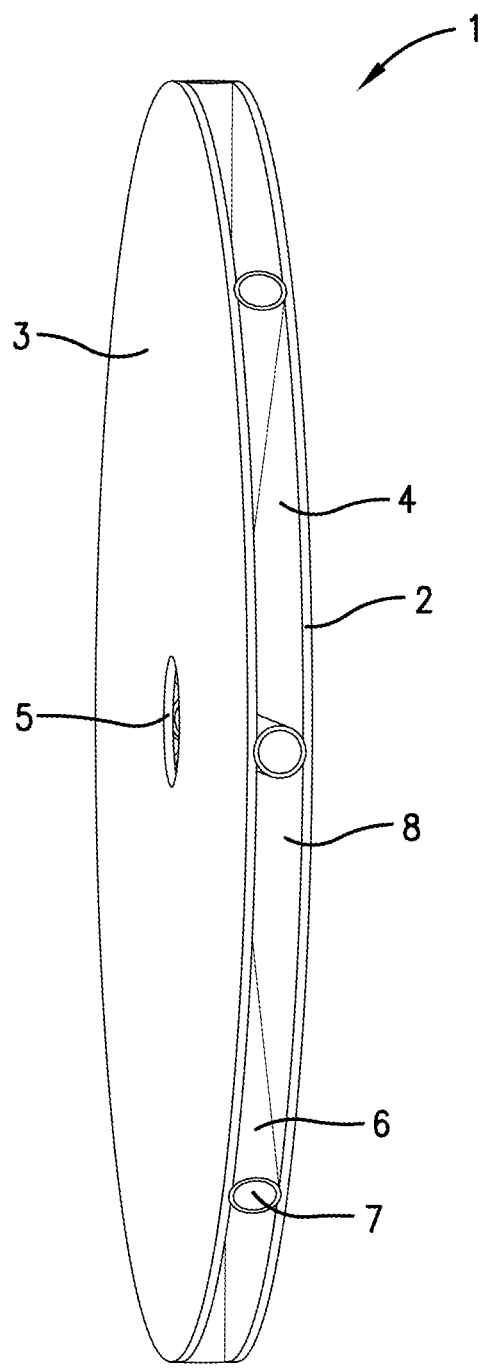
FIG. 1 is a perspective view of the rotor of this invention with two parallel disks.
Figure 2:
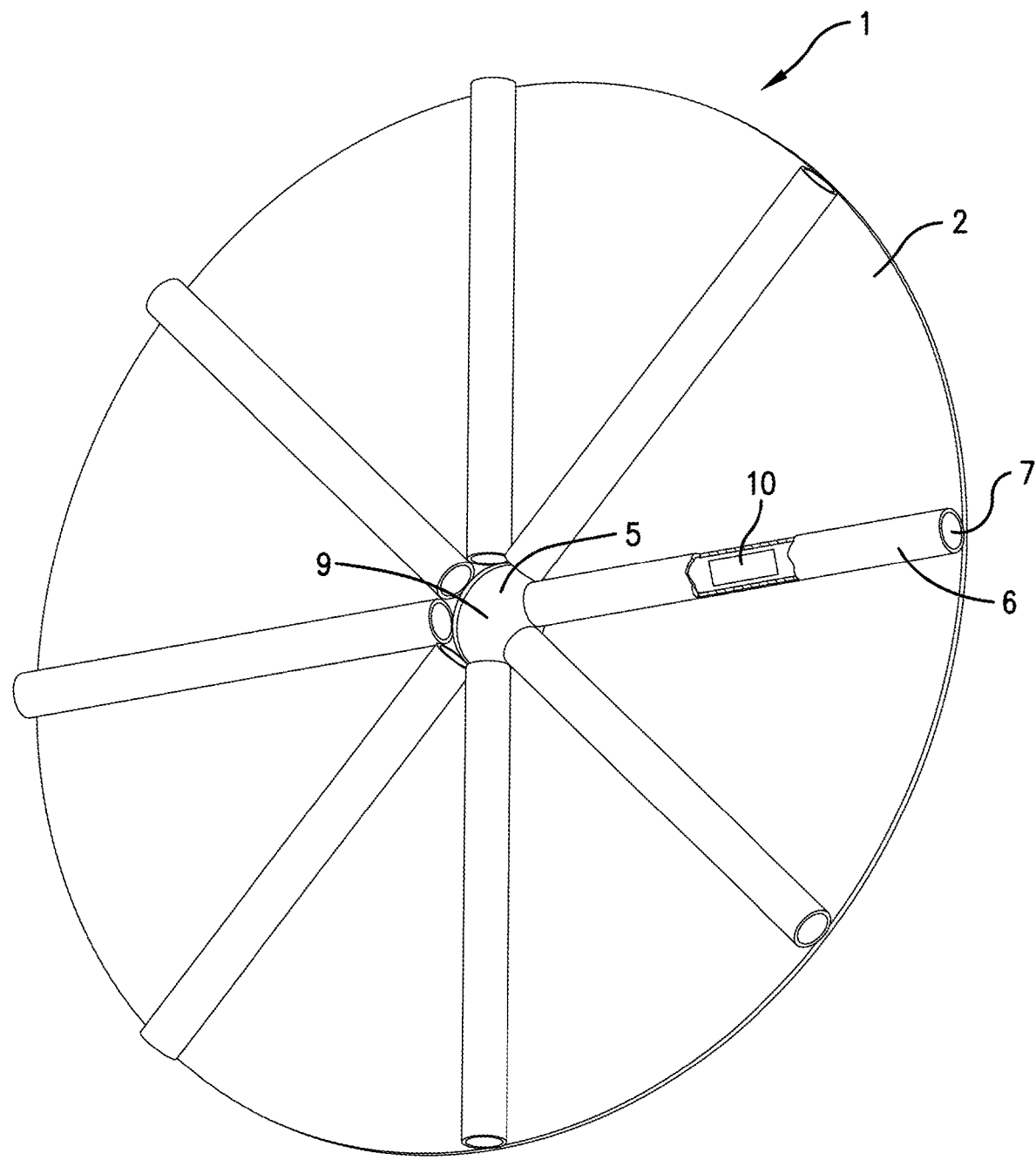
FIG. 2 is another perspective view of the rotor, but with one of the disks removed for clarity of view.

As seen in the drawing, the mass-transfer machine according to the invention has a rotor 1 that as shown in according to FIG. 1 has two circular lateral faces or disks 2 and 3 of the same diameter and both coaxial and parallel with one another that between them form a narrow space 4 of constant width. Both faces/disks 2, 3 are fixed on and extend perpendicularly from an unillustrated central shaft and each have a central aperture 5.

Multiple tubes 6 that form passages 7 extend radially in the space 4 between the two faces/disks 2, 3. The radial 20 tubes begin with their inner end at the edge of the aperture 5 and terminate with their outer end in the outer coaxial, cylindrical annular surface 8 of the rotor 1. At the apertures 5 the inner ends of the tubes/passages form an inner coaxial inner space 9 into which a liquid is delivered. The 25 outer ends of the tubes 6 terminate in the outer cylindrical annular surface 8 of the rotor. This ensures that the tubes 6 or their passages 7 are arranged in the rotor 1, particularly in the center of the rotor, in such a way that the liquid flowing through the rotor flows only through the passages 7.

All tubes 6 are filled with a packing 10, the function of which is to increase the area of contact between the liquid supplied to the inner space 9 and the externally acting gas, in particular so as to optimize mass transfer. The packings 10 enclosed in the passages 7, particularly tubular passages, are preferably of a woven, knitted, meshed or latticed form. Here the packings 10 enclosed in the in particular tubular passages 7 are composed of metal, in particular structured sheet metal, or of plastic or glass fibers.

The passages 7 are formed from metal or plastic tubes 6 that extend radially or at an angle in the rotor 1. In the two embodiments eight tubes/passages are fixed between the disks/faces 2. The number may range from one tube/passage to thirty-two.

In embodiments not shown the tubes 6 and their passages 7 extend outward continuously or in steps. The tubes 6 or their passages 7 may also extend outward continuously or in steps. The tubes/passages may furthermore be assembled from individual, separate portions.

In both embodiments the rotor 1 with its tubes/passages is composed of metal and/or plastic, is supported in an enclosed chamber with gas admission and is powered by an electric motor.

We claim:

1. An apparatus for mass transfer between a liquid and a gas inside a rotor, where
    the liquid is supplied to a center of the rotor and is driven outward by centrifugal force generated by rotation of the rotor,
    the gas surrounding the rotor is forced inward through the rotor by a pressure of the gas, counter to the liquid flow in the rotor, and
    the rotor has a plurality of passages lying in a plane of the rotor that begin at a center of the rotor and terminate at an outer circumference of the rotor,
    wherein the passages are formed by metal or plastic tubes extending radially or at an angle in the rotor,
    wherein the passages are each filled with a packing that increases the area of contact between the liquid and the gas.

2. The apparatus defined in claim 1, wherein the packings in the passages are of a woven, knitted, meshed or latticed form.

3. The apparatus defined in claim 1, wherein the packings in the passages are composed of metal, or of plastic or glass fibers.

4. The apparatus defined in claim 1, wherein inner ends of the passages form an inner coaxial space into which the liquid is delivered.

5. The apparatus defined in claim 1, wherein the passages are arranged in the center of the rotor in such a way that the liquid flowing through the rotor flows only through the passages.

6. The apparatus defined in claim 1, wherein outer ends of the passages terminate in the outer cylindrical annular surface of the rotor.

7. The apparatus defined in claim 1, wherein the rotor comprises two to thirty-two passages.

8. The apparatus defined in claim 1, wherein the rotor comprises two circular disks to which an axle rotation of the rotor runs perpendicular and that form a space between them in which the passages extend.

9. The apparatus defined in claim 1, wherein the passages extend outward continuously.

10. The apparatus defined in claim 1, wherein the rotor comprises two circular disks to which an axle rotation of the rotor runs perpendicular and that form a space between them in which the passages extend.

11. The apparatus defined in claim 1, wherein the passages extend outward continuously.

12. An apparatus for mass transfer between a liquid and a gas inside a rotor, where the liquid is supplied to a center of the rotor and is driven outward by centrifugal force generated by rotation of the rotor and the gas surrounding the rotor is forced inward through the rotor by a pressure of the gas, counter to the liquid flow in the rotor, and wherein:
    the rotor has a plurality of passages lying in a plane of the rotor that begin at a center of the rotor and terminate at an outer circumference of the rotor,
    the passages are formed by metal or plastic tubes extending radially or at an angle in the rotor,
    the passages are each filled with a packing of a woven, knitted, meshed or latticed form that increases the area of contact between the liquid and the gas.

13. The apparatus defined in claim 12, wherein the packings in the passages are composed of structured sheet metal or of plastic or glass fibers.

14. The apparatus defined in claim 13, wherein inner ends of the passages form an inner coaxial space into which the liquid is delivered.

15. The apparatus defined in claim 14, wherein the passages are arranged in the center of the rotor in such a way that the liquid flowing through the rotor flows only through the passages.

16. The apparatus defined in claim 15, wherein outer ends of the passages terminate in the outer cylindrical annular surface of the rotor.

17. The apparatus defined in claim 16, wherein the rotor comprises two to thirty-two passages.

18. An apparatus for mass transfer between a liquid and a gas inside a rotor, where the liquid is supplied to a center of the rotor and is driven outward by centrifugal force generated by rotation of the rotor and the gas surrounding the rotor is forced inward through the rotor by a pressure of the gas, counter to the liquid flow in the rotor, and wherein:
    the rotor has a plurality of passages lying in a plane of the rotor that begin at a center of the rotor and terminate at an outer circumference of the rotor,
    the passages are formed by metal or plastic tubes extending radially or at an angle in the rotor,
    the passages are each filled with a packing of a woven, knitted, meshed or latticed form that increases the area of contact between the liquid and the gas
    the rotor comprises two circular disks to which an axle rotation of the rotor runs perpendicular and that form a space between them in which the passages extend.

19. The apparatus defined in claim 18, wherein the packings in the passages are composed of structured sheet metal or of plastic or glass fibers.

20. The apparatus defined in claim 19, wherein:
    inner ends of the passages form an inner coaxial space into which the liquid is delivered,
    the passages are arranged in the center of the rotor in such a way that the liquid flowing through the rotor flows only through the passages,
    outer ends of the passages terminate in the outer cylindrical annular surface of the rotor.

* * * * *